US009929914B2

(12) United States Patent
Luo et al.

(10) Patent No.: US 9,929,914 B2
(45) Date of Patent: Mar. 27, 2018

(54) METHOD AND SYSTEM FOR RECONSTRUCTING UNMANNED AERIAL VEHICLE FORMATION COMMUNICATION TOPOLOGY BASED ON MINIMUM COST ARBORESCENCE

(71) Applicant: Hefei University of Technology, Hefei (Anhui Province) (CN)

(72) Inventors: He Luo, Hefei (CN); Guoqiang Wang, Hefei (CN); Xiaoxuan Hu, Hefei (CN); Huawei Ma, Hefei (CN); Peng Jin, Hefei (CN); Wei Xia, Hefei (CN)

( * ) Notice: Subject to any disclaimer, the term of this patent is extended or adjusted under 35 U.S.C. 154(b) by 0 days.

(21) Appl. No.: 15/460,369

(22) Filed: Mar. 16, 2017

(65) Prior Publication Data

US 2017/0346679 A1 Nov. 30, 2017

(30) Foreign Application Priority Data

May 27, 2016 (CN) .......................... 2016 1 0383796

(51) Int. Cl.
*H04L 12/24* (2006.01)
*H04L 29/08* (2006.01)
(Continued)

(52) U.S. Cl.
CPC ............ *H04L 41/12* (2013.01); *B64C 39/024* (2013.01); *H04B 7/18506* (2013.01);
(Continued)

(58) Field of Classification Search
CPC ............................. H04L 41/12; B64C 39/024
See application file for complete search history.

(56) References Cited

U.S. PATENT DOCUMENTS

| 2017/0048925 A1* | 2/2017 | Song ..................... H04W 40/22 |
| 2017/0238234 A1* | 8/2017 | Dowlatkhah ......... H04W 8/005 |
| | | 455/517 |
| 2017/0295609 A1* | 10/2017 | Darrow ................ H04W 84/18 |

FOREIGN PATENT DOCUMENTS

| CN | 101043267 A | 9/2007 |
| CN | 103777640 A | 5/2014 |
| CN | 105353766 A | 2/2016 |

OTHER PUBLICATIONS

Chinese Search Report; dated Oct. 27, 2017 for CN Application No. CN 2016103837962.

* cited by examiner

*Primary Examiner* — Marcus R Smith
(74) *Attorney, Agent, or Firm* — Wayne & Ken, LLC; Tony Hom

(57) ABSTRACT

The present disclosure provides a method and system for reconstructing UAV formation communication topology based on minimum cost arborescence, the method comprising: monitoring broadcast communication channel, and judging whether communication failure occurs in UAV in formation; modifying formation communication diagram according to the type of communication failure when communication failure occurs in the UAV; calculating minimum cost arborescence of modified formation communication diagram, and reconstructing UAV formation communication topology according to calculation results. The present disclosure realizes rapid reconstruction of communication topology so as to avoid occurrence of UAV collision accident and restore formation after detecting communication failure, by modifying formation communication diagram according to the type of communication failure and calculating minimum cost arborescence of modified formation communication diagram to reconstruct UAV formation com- (Continued)

munication topology when communication failure occurs in UAV.

6 Claims, 1 Drawing Sheet

(51) Int. Cl.
  *H04B 7/185* (2006.01)
  *B64C 39/02* (2006.01)
(52) U.S. Cl.
  CPC .......... *H04L 41/0668* (2013.01); *H04L 67/12* (2013.01); *B64C 2201/143* (2013.01)

METHOD AND SYSTEM FOR RECONSTRUCTING UNMANNED AERIAL VEHICLE FORMATION COMMUNICATION TOPOLOGY BASED ON MINIMUM COST ARBORESCENCE

TECHNICAL FIELD

The present disclosure relates to unmanned aerial vehicle communication technical art, and in particular, to a method and system for reconstructing unmanned aerial vehicle formation communication topology based on minimum cost arborescence.

BACKGROUND

During the cruise phase, all unmanned aerial vehicles (UAVs) use an initial optimal communication topology so as to maintain a certain formation to fly towards a target area. Communication links in this communication topology are only one part of the set of all available communication links between UAVs, that is, part of the communication links are not used, referred to as redundant communication links. Due to reasons such as mechanical failure, external interference or so forth, communication failure may occur in one or more UAVs during formation flight so that some communication links in the current communication topology cannot be used, thereby resulting in UAVs cannot continue to maintain the formation and even leading to a UAV collision accident in serious situation. Therefore, it becomes a technical problem which is urgently to be solved for how to reconstruct UAV formation communication topology, that is, to select some of the redundant communication links for replacing those communication links which cannot be used in the original communication topology, so as to avoid UAV collision accident and restore formation.

SUMMARY

With respect to defects in the prior art, the present disclosure provides a method and system for reconstructing UAV formation communication topology based on minimum cost arborescence, and realizes rapid reconstruction of communication topology so as to avoid occurrence of UAV collision accident and restore formation after detecting communication failure.

In the first aspect, the present disclosure provides a method for reconstructing UAV formation communication topology based on minimum cost arborescence, comprising:

monitoring broadcast communication channel, and judging whether communication failure occurs in UAV in formation;

modifying formation communication diagram according to the type of communication failure when communication failure occurs in the UAV;

calculating minimum cost arborescence of modified formation communication diagram, and reconstructing UAV formation communication topology according to calculation results.

Alternatively, the modifying of formation communication diagram according to the type of communication failure comprises:

deleting the corresponding node of the UAV and all edges of the node in the formation communication diagram when the broadcast transmitter or the broadcast receiver of the UAV fails;

deleting all outgoing edges of the corresponding node of the UAV in the formation communication diagram when the unicast transmitter of the UAV fails;

deleting all incoming edges of the corresponding node of the UAV in the formation communication diagram when the unicast receiver of the UAV fails;

deleting the edge from the corresponding node of the first UAV to the corresponding node of the second UAV in the formation communication diagram when the communication link from the first UAV to the second UAV fails.

Alternatively, after modifying formation communication diagram according to the type of communication failure, the method further comprises:

in the modified formation communication diagram, if the corresponding node of the UAV is deleted or all edges of the corresponding node of the UAV are deleted, the UAV turns off its own unicast transmitter and departs from formation.

Alternatively, the formation communication diagram is a formation communication diagram after adding the corresponding node of the virtual leader and edges from the corresponding node of the virtual leader to the corresponding nodes of all candidate formation leaders;

Correspondingly, the calculating of the minimum cost arborescence of the modified formation communication diagram, and the reconstructing of the UAV formation communication topology according to the calculation results, comprise:

if the minimum cost arborescence exists, deleting the node of the virtual leader and corresponding edges of the node in the minimum cost arborescence, and obtaining reconstructed UAV formation communication topology.

In the second aspect, the present disclosure further provides a system for reconstructing UAV formation communication topology based on minimum cost arborescence, comprising: one or more processors; a memory; and one or more modules stored in the memory, the one or more modules are configured to perform the following operations when being executed by the one or more processors:

monitoring broadcast communication channel and judging whether communication failure occurs in UAV in formation;

modifying the formation communication diagram according to the type of communication failure when communication failure occurs in the UAV;

calculating the minimum cost arborescence of the modified formation communication diagram;

reconstructing the UAV formation topology according to the calculation results.

Alternatively, the processor is further configured to perform the following steps:

deleting the corresponding node of the UAV and all edges of the node in the formation communication diagram when the broadcast transmitter or the broadcast receiver of the UAV fails;

deleting all outgoing edges of the corresponding node of the UAV in the formation communication diagram when the unicast transmitter of the UAV fails;

deleting all incoming edges of the corresponding node of the UAV in the formation communication diagram when the unicast receiver of the UAV fails;

deleting edge from the corresponding node of the first UAV to the corresponding node of the second UAV in the formation communication diagram when the communication link from the first UAV to the second UAV fails.

Alternatively, the processor is further configured to perform the following steps:

turning off the unicast transmitter of the UAV and sending an out-of-formation signal to the UAV, when the corresponding node of the UAV in the modified formation communication diagram is deleted or all edges of the corresponding node of the UAV are deleted.

Alternatively, the formation communication diagram is the formation communication diagram after adding the corresponding node of the virtual leader and edges from the corresponding node of the virtual leader to the corresponding nodes of all candidate formation leaders;

Correspondingly, the processor is further configured to perform the following steps:

deleting the node of the virtual leader and corresponding edges of the node in the minimum cost arborescence when the minimum cost arborescence exists, and obtaining reconstructed UAV formation communication topology.

It can be known from the technical solution described above that the present disclosure provides a method and system for reconstructing UAV formation communication topology based on minimum cost arborescence, and realizes rapid reconstruction of communication topology so as to avoid occurrence of UAV collision accident and restore formation after detecting communication failure, by modifying formation communication diagram according to the type of communication failure and calculating minimum cost arborescence of modified formation communication diagram to reconstruct UAV formation communication topology when communication failure occurs in UAV.

BRIEF DESCRIPTION OF THE DRAWINGS

In order to more clearly illustrate the embodiments of the present disclosure or the technical solution of the prior art, hereinafter, it will briefly introduce the accompanying drawings that are required to be used in the description of the embodiments or the prior art. Obviously, the accompanying drawings in the following description are only some of the embodiments of the present disclosure, and it is able for those of ordinary skilled in the art to obtain other drawings according to these drawings without any creative work.

DETAILED DESCRIPTION

Hereinafter, the technical solution in the embodiments of the present disclosure will be described clearly and completely in combination with the accompanying drawings in the embodiments of the present disclosure. Obviously, the described embodiments are only one part of the embodiments of the present disclosure, not all of the embodiments. Based on the embodiments in the present disclosure, all of the other embodiments obtained by those of ordinary skilled in the art without creative work belong to the scope that the present disclosure claims.

Figure 1:
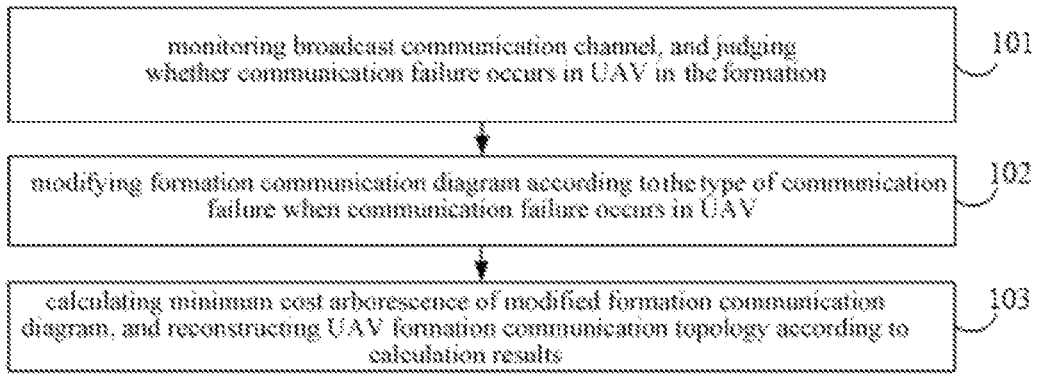
FIG. 1 is a schematic flow diagram of a method for reconstructing UAV formation communication topology based on minimum cost arborescence according to one embodiment of the present disclosure.

FIG. 1 illustrates a schematic flow diagram of a method for reconstructing UAV formation communication topology based on minimum cost arborescence according to an embodiment of the present disclosure. As shown in FIG. 1, the method comprises the following steps:

101, monitoring broadcast communication channel, and judging whether communication failure occurs in UAV in formation;

102, modifying formation communication diagram according to the type of communication failure when communication failure occurs in UAV;

103, calculating minimum cost arborescence of modified formation communication diagram, and reconstructing UAV formation communication topology according to calculation results.

The method above realizes rapid reconstruction of communication topology so as to avoid occurrence of UAV collision accident and restore formation after detecting communication failure, by modifying formation communication diagram according to the type of communication failure and calculating minimum cost arborescence of modified formation communication diagram to reconstruct UAV formation communication topology when communication failure occurs in UAV.

The modifying of formation communication diagram according to the type of communication failure in the step 102 comprises the following aspects:

deleting the corresponding node of the UAV and all edges of the node in the formation communication diagram when the broadcast transmitter or the broadcast receiver of the UAV fails;

deleting all outgoing edges of the corresponding node of the UAV in the formation communication diagram when the unicast transmitter of the UAV fails;

deleting all incoming edges of the corresponding node of the UAV in the formation communication diagram when the unicast receiver of the UAV fails;

deleting edge from the corresponding node of the first UAV to the corresponding node of the second UAV in the formation communication diagram when the communication link from the first UAV to the second UAV fails.

After modifying the formation communication diagram according to the type of communication failure in the step 102, the method further comprises:

in the modified formation communication diagram, if the corresponding node of the UAV is deleted or all edges of corresponding node of the UAV are deleted, the UAV turns off its own unicast transmitter and departs from formation.

Wherein, the formation communication diagram is a formation communication diagram after adding the corresponding node of the virtual leader and edges from the corresponding node of the virtual leader to the corresponding nodes of all candidate formation leaders;

Correspondingly, the calculating of minimum cost arborescence of modified formation communication diagram, and the reconstructing of UAV formation communication topology according to calculation results in the step 103, comprise:

if the minimum cost arborescence exists, deleting the node of the virtual leader and corresponding edges of the node in the minimum cost arborescence, and obtaining reconstructed UAV formation communication topology.

Before describing the method above in detail, formation control methods for UAV to create and maintain formation as well as formation communication topology are described first.

There are mainly four kinds of formation control methods for UAV to create and maintain formation: leader-follower strategy, virtual structure strategy, behavioral strategy and consensus-based strategy. Wherein, the leader-follower strategy is most mature, whose basic idea is: only one UAV in the formation, as the formation leader, flies according to a predetermined formation reference track; other UAVs, as followers, follow the formation leader directly or indirectly. For example, one UAV may directly follow the formation leader, or may follow another UAV that directly or indirectly follows the formation leader. If the ith UAV $UAV_i$ directly follows the jth UAV $UAV_j$, $UAV_i$ is referred to as the follower of $UAV_j$ and $UAV_j$ is referred to as the leader of $UAV_i$. $UAV_j$ will send its position, speed and direction information to the $UAV_i$ through a point-to-point communication link every $T_{control}$ seconds. After $UAV_i$ receives these information, it will accordingly adjust its own speed and direction to realize maintenance of an expected relative position between itself and $UAV_j$. When all UAVs can realize maintenance of expected relative positions between themselves and the leader, maintenance of the formation is realized.

It is assumed that n UAVs use the leader-follower strategy to create and maintain a formation S, n positions in S are numbered {1, 2, . . . , n}, each UAV can be located in any position in S, a few UAVs but not all UAVs can be used as the formation leader (these UAVs are also referred to as candidate formation leaders), each UAV can exchange information with any other UAV through a point-to-point communication link, and communication cost of each communication link is determined by its corresponding communication distance. Therefore, a weighted directed graph G=(V, E, W, P) can be used to represent all available communication links between UAVs in the formation, referred to as a formation communication diagram.

(1) V={$v_i$}, 1≤i≤n is a set of nodes in the diagram, where $v_i$ represents the ith UAV $UAV_i$.

(2) E={$e_{ij}$} ⊂ V×V, 1≤i, j≤n is a set of edges in the diagram, where $e_{ij}$ represents there is an available communication link from $UAV_i$ to $UAV_j$, thereby enabling $UAV_i$ to send information to $UAV_j$, that is, $UAV_i$ can be the leader of $UAV_j$.

(3) W={$w(e_{ij})$}, $e_{ij}$ ∈E is a set of weight for each edge in the diagram, where $w(e_{ij})$ represents the communication cost of $e_{ij}$.

(4) P={$p_i$}, 1≤i≤n is a set of a specific position of each UAV in the formation S, referred to as UAV position configuration, where $p_i$ represents the specific position of $UAV_i$ in S.

According to the description above, it can be known that each UAV only needs to receive information from its leader and send information to its follower, which means that creation and maintenance of the formation can be realized without using all available communication links, wherein the set of communication links that are used is referred to as communication topology of the UAV formation and the communication links that are not used are referred to as redundant communication links. Therefore, the communication topology of the UAV formation A=(V, E*, W*, P) is a special subgraph of its formation communication diagram G=(V, E, W, P), where E* ⊂ E, W* ⊂ W. Let w(A) represents the communication cost of communication topology A, and then there is $$w(A) = \sum_{e_{ij} \in E^*} w(e_{ij}).$$

Communication topology A has the following two characteristics.

Theorem 1: the communication topology A of the UAV formation based on the leader-follower strategy has to be a spanning tree of its formation communication diagram G, but it is not necessary for a spanning tree of its formation communication diagram G to be its communication topology.

Theorem 2: the communication topology A of the UAV formation based on the leader-follower strategy has to be a spanning tree of its formation communication diagram G, and UAV represented by its root node has to be able to act as the formation leader; vice versa.

Due to reasons such as mechanical failure, external interference or so forth, communication failure may occur in one or more UAVs during formation flight so that some of the communication links in the current communication topology become unavailable, thereby resulting in UAVs cannot continue to maintain the formation and even leading to a UAV collision accident in serious situation. Therefore, it is required to reconstruct UAV formation communication topology, that is, to select some of the redundant communication links for replacing those unavailable communication links in the original communication topology, so as to avoid a UAV collision accident and restore the formation; besides, since different communication links have different communication cost, it is required to select suitable redundant communication links to ensure that the formation communication cost corresponding to the reconstructed communication topology (that is, a sum of the cost of communication links in the reconstructed communication topology) is minimum.

Therefore, the reconstruction problem of communication topology under communication failure is to find out a spanning tree of formation communication diagram G, which satisfies the following conditions, after deleting the node or edges of communication failure: having the minimum communication cost and the UAV represented by its root node can act as the formation leader. The present embodiment models this problem as a minimum cost arborescence (MCA) problem in graph theory, that is, to solve the minimum spanning tree of a weighted directed graph. The first algorithm for solving MCA problem is Edmonds algorithm, whose computational complexity is O(|E|×|V|). Later, Gabow et al also proposed a faster implementation for Edmonds algorithm, whose computational complexity is O(|E|+|V|×log|V|).

A method for reconstructing UAV formation communication topology based on minimum cost arborescence, which is proposed by the present disclosure, is described in detail below by specific embodiments:

After communication failure occurs, execution of communication topology reconstruction has to be distributed to obtain shorter execution time, and calculation results of all UAV have to be consistent, and thus all UAVs has to be informed of the same communication failure information in a timely manner. To this end, based on method of the prior art, it is assumed that each UAV can use a broadcast communication channel (BC) to obtain the same communication failure information: (1) each UAV has a unicast transmitter and a unicast receiver for point-to-point communication, and each UAV has a broadcast transmitter and a broadcast receiver for broadcast communication through BC. (2) each UAV reports its status through BC every $T_{active}$ seconds. (3) when one UAV detects a certain communication failure, it immediately notifies other UAVs through BC.

In addition to the four communication failures considered in the prior art, two other communication failures are taken into consideration: broadcast transmitter failure and broadcast receiver failure. All six types of communication faults are shown in Table 1.

TABLE 1

| Type of communication failure | Description |
| --- | --- |
| Link interrupt | When a link interrupt occurs in $e_{ij}$, $UAV_j$ cannot receive any information sent by $UAV_i$ through point-to-point communication, but both of the unicast transmitter of $UAV_i$ and the unicast receiver of the $UAV_j$ work normally. |
| Unicast transmitter failure | When a unicast transmitter failure occurs in $UAV_i$, $UAV_i$ cannot send any information to other UAVs through point-to-point communication. |
| Unicast receiver failure | When a unicast receiver failure occurs in $UAV_i$, $UAV_i$ cannot receive any information sent by other UAVs through point-to-point communication. |
| Unicast transceiver failure | When a unicast transceiver failure occurs in $UAV_i$, $UAV_i$ can neither send any information to other UAVs through point-to-point communication, nor receive any information sent by other UAVs through point-to-point communication. |
| Broadcast transmitter failure | When a broadcast transmitter failure occurs in $UAV_i$, $UAV_i$ cannot send its own status or communication failure information to other UAVs through BC. |
| Broadcast receiver failure | When a broadcast receiver failure occurs in $UAV_i$, $UAV_i$ cannot receive status or communication failure information sent from other UAVs through BC. |

With respect to these six kinds of communication failures, it is assumed that all UAVs have the same communication fault diagnosis strategy as described below:

(1) when any communication failure in a unicast transmitter failure, a unicast receiver failure, a unicast transceiver failure or a broadcast receiver failure occurs in $UAV_i$, $UAV_i$ itself can detect this fault, and $UAV_i$ will record the timestamp at which this failure occurred and inform other UAVs of the failure and corresponding timestamp information through BC.

(2) when a broadcast transmitter failure occurs in $UAV_i$, $UAV_i$ itself can detect this failure but can not notify other UAVs through BC. After $T_{active}$ seconds, since other UAVs cannot receive status reported by $UAV_i$, they will determine that a broadcast transmitter failure occurs in $UAV_i$ and record timestamp at which the failure occurred.

(3) when a link interrupt occurs in $e_{ij}$ and $UAV_i$ is the leader of $UAV_j$, $UAV_j$ cannot receive position, speed and direction information sent by $UAV_i$. After $T_{active}$ seconds, if $UAV_j$ itself does not have a unicast receiver failure and does not receive unicast transmitter fault information of the $UAV_i$ through BC, $UAV_j$ will determine that a link interrupt occurs in $e_{ij}$, and $UAV_j$ will record timestamp of this failure, and then inform other UAVs of this failure and corresponding timestamp information through BC.

(4) if one UAV receives two or more communication failure information within $T_{active}$ seconds, only the communication failure with the earliest timestamp is processed and the remaining communication faults are left to be processed in the next $T_{active}$ seconds. As such, conflicting decisions between UAVs can be avoided, thereby enabling all UAVs to obtain consistent communication failure processing results.

Based on the communication fault diagnosis strategy described above, each UAV can obtain the information of the communication failure in time, each UAV can then delete the edges or nodes in which failure occurs in the formation communication diagram G, and subsequently run Edmonds algorithm to obtain the minimum cost arborescence A of G. If the UAV represented by root node $v_i$ of A can act as the formation leader, A is a feasible communication topology, that is, all UAVs can reconstruct communication topology as A in order to continue to maintain the formation; otherwise, A is not a feasible communication topology, that is, all UAVs cannot use A to maintain the formation, but it does not necessarily represent that there is not another feasible communication topology under this circumstance. In order to solve this problem, the present embodiment first adds a special node named Virtual Leader (VL) and its corresponding outgoing edges with a specific weight to its original formation communication diagram G, thereby creating a new formation communication diagram G'=(V', E', W', P'):

(1) V'={$v_0$}∪V is a set of nodes of diagram G', where $v_0$ is virtual leader VL, which represents a virtual point in a predetermined formation reference track.

(2) E' {$e_{0k}$}∪E, 1≤k≤n is a set of edges of diagram G', where $e_{0k}$ represents that the kth UAV $UAV_k$ knows the predetermined formation reference track, that is, $UAV_k$ is a candidate formation leader.

(3) W'={w($e_{0k}$)}∪W, $e_{0k}$∈E' is a set of weight for each edge of diagram G', where all outgoing edges of $v_0$ have the same weight $$w(e_{0k}) = \sum_{i=1}^{n} \sum_{j=1}^{n} w(e_{ij}) + 1, e_{ij} \in E,$$

that is, w($e_{0k}$) is larger than a sum of weights of all edges in the original formation communication diagram G by 1.

(4) P={$p_i$}, 1≤i≤n is a set of specific position for each UAV in formation S, referred to as UAV position configuration, where $p_i$ represents the specific position of $UAV_i$ in S.

Based on the definition of G', the following conclusion can be drawn.

Theorem 3: If minimum cost arborescence A' of the new formation communication diagram G' exists and $v_0$ has only one outgoing edge, the optimal communication topology A of the formation on the basis of the original formation communication diagram G exists, and it is a result after deleting $v_0$ and $v_0$'s outgoing edges in A'.

Then, based on the analysis above, the present embodiment proposes a distributed topology reconstruction algorithm under communication failure based on the minimum cost arborescence, as shown in Table 2. When communication failure occurs, each UAV will perform this algorithm. $UAV_i$, for example, runs this algorithm when it receives a communication failure notification from another UAV or detects a communication failure on its own through BC.

TABLE 2

Communication topology reconstruction algorithm under communication failure

Input: current formation communication diagram G = (V, E, W, P) and current communication topology A = (V, E*, W*, P).
Output: reconstructed communication topology $A_r$ = ($V_r$, $E_r$*, $W_r$*, P).
Step 1. modifying G and A according to the type of communication failure: If a unicast transmitter failure occurs in $UAV_j$, deleting all outgoing edges of $v_j$. If a unicast receiver failure occurs in $UAV_j$, deleting all incoming edges of $v_j$. If a unicast transceiver failure or broadcast transmitter failure or broadcast receiver failure occurs in $UAV_j$, deleting all incoming and outgoing edges of $v_j$. If a link interrupt occurs in communication link from $UAV_j$ to $UAV_k$, deleting $e_{jk}$.
Step 2. constructing new formation communication diagram G' = (V', E', W', P) by adding VL($v_0$) and its corresponding outgoing edges into G.

TABLE 2-continued

Communication topology reconstruction
algorithm under communication failure

Step 3. if the operation for Step 1 does not delete any edge in A, there is no need to reconstruct communication topology. Let $A_r$ = A and jump to Step 10.
Step 4. if $v_i$ does not have any edge, $UAV_i$ needs to first fly up to another altitude $h_i = h_0 + 200*i$ as quickly as possible in order to avoid collision with other UAVs, and then flies back to the airport alone to which it belongs, that is, $UAV_i$ no longer belongs to the formation. Let $A_r$ = NULL and then jump to Step 10.
Step 5. if $v_i$ only has one edge $e_{0i}$, $UAV_i$ needs to first fly up to another altitude $h_i = h_0 + 200*i$ as quickly as possible in order to avoid collision with other UAVs, and then remains at this altitude $h_i$ to follow the predetermined formation reference track alone, that is, $UAV_i$ no longer belongs to the formation. Let $A_r$ = NULL and then jump to Step 10.
Step 6. if any node $v_j (j \neq 0, j \neq i)$ exists, which does not have any edges or only has one edge $e_{0j}$, deleting $v_j$ and its all edges in G'.
Step 7. calculating the minimum cost arborescence A' of G'.
Step 8. if $v_0$ only has one outgoing edge $e_{0j}$ in A', deleting $v_0$ and $e_{0j}$ so as to obtain reconstructed communication topology $A_r$ (where $UAV_j$ is the new formation leader), and jump to Step 10.
Step 9. $v_0$ has two or more outgoing edges in A', thus current formation needs to be divided into two or more sub-formations. Each edge $e_{0j}$ of $v_0$ in A' represents that $UAV_j$ is selected as the formation leader of a sub-formation. In particular, if $e_{0i}$ is also in A', $UAV_i$ needs to fly up to another altitude $h_i = h_0 + 200*i$ as quickly as possible in order to avoid collision with other UAVs in other sub-formations. Deleting $v_0$ and $v_0$'s all outgoing edges so as to obtain reconstructed communication topology $A_r$.
Step 10. if $A_r \neq$ NULL, $A_r$ is the reconstructed communication topology.

After each UAV performs this algorithm, the remaining UAVs in the formation will rapidly switch to the reconstructed communication topology so as to recover the formation. The running time of this algorithm is mainly determined by Step 7, whereas the faster implementation for Edmonds algorithm, which is proposed by Gabow et al, is used in Step 7, thus the computational complexity of the communication topology reconstruction algorithm proposed in the present embodiment is $O(|E'|+|V'| \times \log|V'|)$, where $|E'| \leq |E|+|V|$, $|V'| \leq |V|+1$. Compared with the current communication topology reconstruction algorithm under communication failure, this algorithm has the following advantages:

(1) time complexity is lower.
(2) formation communication cost corresponding to the reconstructed communication topology is smaller.
(3) it can process more types of communication failure.

Figure 2:
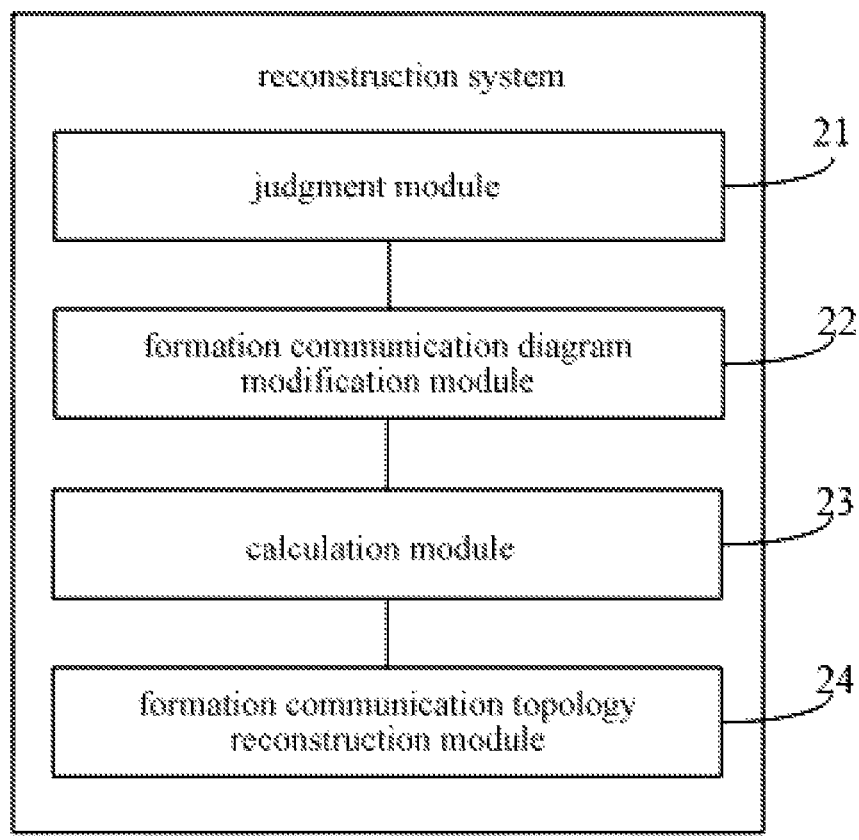
FIG. 2 is a schematic structure diagram of a system for reconstructing UAV formation communication topology based on minimum cost arborescence according to one embodiment of the present disclosure.

FIG. 2 illustrates a schematic structure of a system for reconstructing UAV formation communication topology based on minimum cost arborescence according to one embodiment of the present disclosure.

The embodiment of the present disclosure further provides a storage medium, used for storing the above computer program. As shown in FIG. 2, the system comprises:

a judgment module 21, for monitoring broadcast communication channel and judging whether communication failure occurs in UAV in the formation;

a formation communication diagram modification module 22, for modifying a formation communication diagram according to the type of communication failure when communication failure occurs in the UAV;

a calculation module 23, for calculating the minimum cost arborescence of the modified formation communication diagram;

a formation communication topology reconstruction module 24, for reconstructing the UAV formation topology according to the calculation results.

In a preferred embodiment of the present embodiments, the formation communication diagram modification module is used for:

deleting the corresponding node of the UAV and all edges of the node in the formation communication diagram when the broadcast transmitter or the broadcast receiver of the UAV fails;

deleting all outgoing edges of the corresponding node of the UAV in the formation communication diagram when the unicast transmitter of the UAV fails;

deleting all incoming edges of the corresponding node of the UAV in the formation communication diagram when the unicast receiver of the UAV fails;

deleting edge from the corresponding node of the first UAV to the corresponding node of the second UAV in the formation communication diagram when the communication link from the first UAV to the second UAV fails.

In a preferred embodiment of the present embodiments, the system further comprises:

a unicast transmitter turning-off module, for turning off the unicast transmitter of the UAV and sending an out-of-formation signal to the UAV, when the corresponding node of the UAV in the modified formation communication diagram is deleted or all edges of the corresponding node of the UAV are deleted.

In a preferred embodiment of the present embodiments, the formation communication diagram is the formation communication diagram after adding the corresponding node of the virtual leader and edges from the corresponding node of the virtual leader to the corresponding nodes of all candidate formation leaders;

Correspondingly, the formation communication topology reconstruction module is used for:

deleting the node of the virtual leader and corresponding edges of the node in the minimum cost arborescence when the minimum cost arborescence exists, and obtaining reconstructed UAV formation communication topology.

It should be indicated that the system above is in a one-to-one correspondence with the method above, and the implementation details of the method above are equally applicable to the system above. Therefore, the system above will not be described in detail in the present embodiments.

In the specification of the present disclosure, numerous specific details are set forth. However, it can be understood that embodiments of the present disclosure may be practiced without these specific details. In some instances, well-known methods, structures, and techniques are not shown in detail in order not to obscure the understanding of the specification.

Similarly, it is to be understood that in order to simplify disclosure of the present disclosure and to assist the understanding of one or more of the various inventive aspects, in the above description of exemplary embodiments of the present disclosure, the various features of the present disclosure are sometimes grouped together into a single embodiment, Fig, or description thereof. However, the method of the disclosure should not be interpreted as reflecting the following intent: that is, the claimed disclosure requires more features than features that are expressly recited in each claim. More precisely, as reflected in the following claims, the inventive aspects are less than all the features of a single embodiment disclosed preciously. Therefore, the claims following the detailed description are hereby expressly incorporated into this specific embodiment, wherein each claim itself serves as a separate embodiment of the present disclosure.

A person skilled in the art can understand that the modules in the apparatus in the embodiment can be adaptively changed and disposed in one or more apparatus different from the embodiment. The modules or units or components in the embodiments may be combined into one module or unit or component, and in addition they may be divided into sub-modules or sub-units or sub-components. Except that at least some of the features and/or processes or elements are mutually exclusive, any combination can be adopted to combine all the features disclosed in the present specification (including accompanying claims, abstract and drawings) and any processes or units of any method or apparatus so disclosed. Unless otherwise expressly stated, each feature disclosed in the present specification (including accompanying claims, abstract and drawings) may be replaced by alternative features that provide the same, identical, or similar purpose.

Furthermore, A person skilled in the art can understand that, although some of the embodiments described herein include certain features rather than other features included in other embodiments, combinations of features of different embodiments are meant to be within the scope of the disclosure and to form different embodiments. For example, in the following claims, any one of the claimed embodiments may be used in any combination.

The various component embodiments of the present disclosure may be realized in hardware, or in software modules operating on one or more processors, or in combinations thereof. It is to be understood by a person skilled in the art that microprocessors or digital signal processors (DSP) may be used in practice to realize some or all of the functions of some or all of the apparatus of a browser terminal according to the embodiments of the present disclosure. The present disclosure may also be implemented as an apparatus or device program (e.g., a computer program and a computer program product) for performing a part or all of the methods described herein. The program of the present disclosure realized in this way may be stored on a computer readable medium or may be in the form of one or more signals. Such signals may be downloaded from the Internet website or provided on the carrier signal in any other forms.

It is to be noted that the above-mentioned embodiments are used for illustrating the present disclosure, rather than limiting it, and a person skilled in the art can design alternative embodiments without departing from the scope of the attached claims. In the claims, any reference symbols located between parentheses should not be construed as limiting the claims. The word "comprise" does not exclude the presence of elements or steps that are not listed in the claims. The word "a" or "an" preceding an element does not exclude the presence of a plurality of such elements. The present disclosure may be realized by means of hardware comprising several distinct elements and by means of a suitably programmed computer. In the element claims enumerating several devices, several of these devices may be embodied by the same item of hardware. The use of the words first, second, third and so forth does not denote any sequence. These words can be interpreted as names.

Finally, it is to be noted that the above-mentioned embodiments are only used for illustrating the technical solutions of the present disclosure, rather than limiting them; although the present disclosure has been described in detail with reference to the foregoing embodiments, those of ordinary skilled in the art should understand that they may still make modifications to the technical solutions recorded in the foregoing embodiments or make equivalent substitutions to a part of or all technical features therein; and these modifications or substitutions do not make the essence of the corresponding technical solutions depart from the scope of the various embodiments of the present disclosure, which should be encompassed within the scope of the claims and the description of the present disclosure.

What is claimed is:

1. A method for reconstructing Unmanned Aerial Vehicle (UAV) formation communication topology based on minimum cost arborescence, comprising:
   monitoring broadcast communication channel, and judging whether a communication failure occurs in UAV in formation;
   modifying formation communication diagram according to a type of the communication failure when communication failure occurs in the UAV; and
   calculating minimum cost arborescence of modified formation communication diagram, and reconstructing UAV formation communication topology according to calculation results;
   wherein the modifying of formation communication diagram according to a type of communication failure comprises:
   deleting the corresponding node of the UAV and all edges of the node in the formation communication diagram when a broadcast transmitter or a broadcast receiver of the UAV fails;
   deleting all outgoing edges of the corresponding node of the UAV in the formation communication diagram when a unicast transmitter of the UAV fails;
   deleting all incoming edges of the corresponding node of the UAV in the formation communication diagram when a unicast receiver of the UAV fails; and
   deleting an edge from the corresponding node of the first UAV to the corresponding node of the second UAV in the formation communication diagram when a communication link from the first UAV to the second UAV fails.

2. The method of claim 1, wherein after modifying formation communication diagram according to the type of communication failure, the method further comprises:
   in the modified formation communication diagram, if the corresponding node of the UAV is deleted or all edges of the corresponding node of the UAV are deleted, the UAV turns off its own unicast transmitter and departs from formation.

3. The method of claim 1, wherein the formation communication diagram is a formation communication diagram after adding the corresponding node of the virtual leader and edges from the corresponding node of the virtual leader to the corresponding nodes of all candidate formation leaders; and
   wherein the calculating of the minimum cost arborescence of the modified formation communication diagram and reconstructing of the UAV formation communication topology according to calculation results, comprises:
   if the minimum cost arborescence exists, deleting the corresponding node of the virtual leader and corresponding edges of the node in the minimum cost arborescence, and obtaining reconstructed UAV formation communication topology.

4. A system for reconstructing Unmanned Aerial Vehicle (UAV) formation communication topology based on minimum cost arborescence, comprising:
   one or more processors; a memory; and one or more modules stored in the memory, the one or more modules are configured to perform the following operations when being executed by the one or more processors;
   monitoring broadcast communication channel and judging whether a communication failure occurs in UAV in formation;

modifying the formation communication diagram according to a type of the communication failure when communication failure occurs in the UAV;
calculating minimum cost arborescence of modified formation communication diagram; and
reconstructing the UAV formation topology according to calculation results;
wherein the processor is further configured to perform the following steps:
deleting the corresponding node of the UAV and all edges of the node in the formation communication diagram when a broadcast transmitter or a broadcast receiver of the UAV fails;
deleting all outgoing edges of the corresponding node of the UAV in the formation communication diagram when a unicast transmitter of the UAV fails;
deleting all incoming edges of the corresponding node of the UAV in the formation communication diagram when a unicast receiver of the UAV fails;
deleting the edge from the corresponding node of the first UAV to the corresponding node of the second UAV in the formation communication diagram when a communication link from the first UAV to the second UAV fails.

5. The system of claim 4, wherein the system further comprises:
a unicast transmitter turning off module for turning off the unicast transmitter of the UAV and sending an out-of-formation signal to the UAV, when the corresponding node of the UAV in the modified formation communication diagram is deleted or all edges of the corresponding node of the UAV are deleted.

6. The system of claim 4, wherein the formation communication diagram is a formation communication diagram after adding the corresponding node of the virtual leader and edges from the corresponding node of the virtual leader to the corresponding nodes of all candidate formation leaders; and the formation communication topology reconstruction module is used for:
deleting the corresponding node of the virtual leader and corresponding edges of the node in the minimum cost arborescence when the minimum cost arborescence exists, and obtaining reconstructed UAV formation communication topology.

* * * * *